United States Patent
Zhang et al.

(10) Patent No.: US 8,840,410 B2
(45) Date of Patent: Sep. 23, 2014

(54) POP-UP MECHANISM HAVING A SLIDING PUSHING PILLAR COUPLED TO A SPRING

(71) Applicants: Fu Tai Hua Industry (Shenzhen) Co., Ltd., Shenzhen (CN); Hon Hai Precision Industry Co., Ltd., New Taipei (TW)

(72) Inventors: Jun-Liang Zhang, Shenzhen (CN); Che-Yu Chou, New Taipei (TW); Qun Huang, Shenzhen (CN); Tai-Shan Zhu, Shenzhen (CN); Wen-Chih Lan, New Taipei (TW); Tao Jiang, Shenzhen (CN); Hai-Qian Ge, Shenzhen (CN); Wei-Wei Yu, Shenzhen (CN); Zhi-Jun Shi, Shenzhen (CN); Ji-Bing Guo, Shenzhen (CN); Hua-Yong Wang, Shenzhen (CN); Zhou Chen, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/790,344

(22) Filed: Mar. 8, 2013

(65) Prior Publication Data
US 2013/0260584 A1 Oct. 3, 2013

(30) Foreign Application Priority Data
Apr. 2, 2012 (CN) .......................... 2012 1 0095492

(51) Int. Cl.
*H01R 13/62* (2006.01)
*H04M 1/00* (2006.01)
*H01R 13/635* (2006.01)

(52) U.S. Cl.
CPC .............. *H01R 13/635* (2013.01); *H04M 1/00* (2013.01)
USPC ......................................... 439/159

(58) Field of Classification Search
None
See application file for complete search history.

(56) References Cited

U.S. PATENT DOCUMENTS

| | | | |
|---|---|---|---|
| 8,545,260 B2 * | 10/2013 | Zhou et al. ................... | 439/501 |
| 8,638,563 B2 * | 1/2014 | Peng et al. .................... | 361/740 |
| 2006/0166533 A1 * | 7/2006 | Muramatsu et al. .......... | 439/160 |
| 2012/0220162 A1 * | 8/2012 | Zhou et al. ................... | 439/501 |
| 2013/0260584 A1 * | 10/2013 | Zhang et al. ................. | 439/159 |

* cited by examiner

*Primary Examiner* — Chandrika Prasad
(74) *Attorney, Agent, or Firm* — Novak Druce Connolly Bove + Quigg LLP

(57) ABSTRACT

A charger for charging an electronic device includes a base, a connector for connecting to the electronic device, and a pop-up mechanism. The pop-up mechanism includes a restricting unit, a pushing pillar and a return structure. The restricting unit includes a restricting sidewall and a bottom sidewall. The pushing pillar is connected to the bottom sidewall via a spring. The pushing pillar includes a resilient engaging arm. The pushing pillar is urged by the spring to an uppermost position where a top of the resilient engaging arm is located above the return structure. When the pushing pillar is pressed downwards, the resilient engaging arm slides in a positioning cutout of the return structure to hold the pushing pillar in a lower position. When the pushing pillar is further pressed downwards, the resilient engaging arm escapes from the positioning cutout to drives the pushing pillar returns to the uppermost position.

20 Claims, 8 Drawing Sheets

POP-UP MECHANISM HAVING A SLIDING PUSHING PILLAR COUPLED TO A SPRING

BACKGROUND

1. Technical Field

The present disclosure relates to pop-up mechanisms, and more particularly, to a pop-up mechanism used in an electronic device charger such as a cellular phone charger.

2. Description of Related Art

Generally, an electronic device charger such as a cellular phone charger uses a charging connector to connect to the cellular phone. The cellular phone needs to be separated from the charging connector when the charging is finished. A user has to use two hands to separate the cellular phone from the cellular phone charger when the cellular phone charger is itself not firmly fixed. This may be inconvenient for the user.

Therefore, it is desirable to provide a means which can overcome the above-mentioned problems.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Embodiments of the present disclosure will now be described in detail below, with reference to the accompanying drawings.

Figure 1:
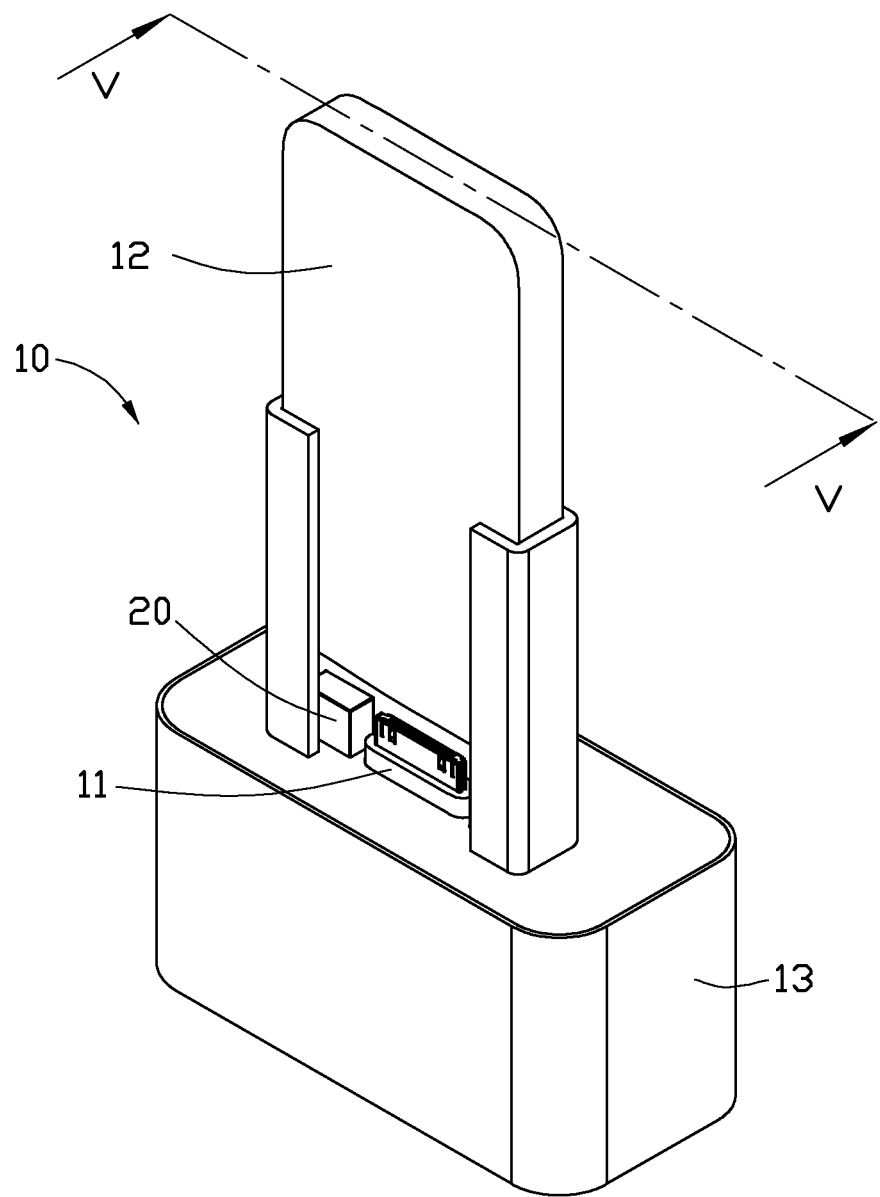
FIG. 1 is an isometric view of a charger for charging an electronic device, according to an exemplary embodiment.
Figure 2:
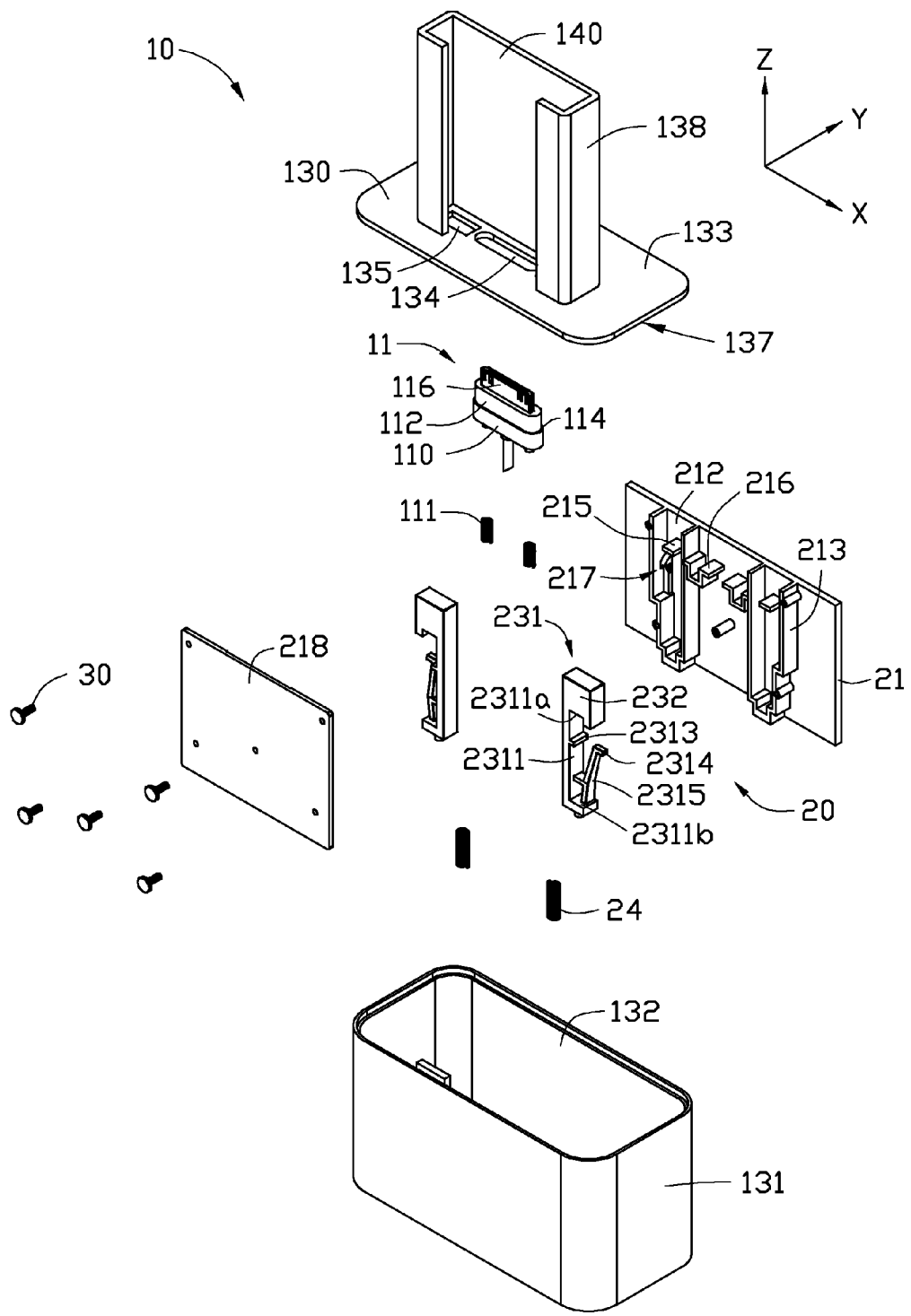
FIG. 2 is an exploded view of the charger of FIG. 1, the charger including a pair of restricting units.

FIGS. 1 and 2 illustrate a charger 10 in accordance with an exemplary embodiment. The charger 10 connects to an electronic device 12, and provides electrical power to charge the electronic device 12. In this embodiment, the electronic device 12 is a cellular phone. The charger 10 includes a base 13, an electrical connector 11, and a pop-up mechanism 20. The connector 11 protrudes out of the base 13 to connect to the electronic device 12. The pop-up mechanism 20 includes a pair of restricting units 213 set on two opposite sides of the connector 11, a pair of pushing pillars 231 resiliently biased and slidable in the restricting units 213, and a pair of return structures 217 formed in the restricting units 213. The pushing pillars 231 correspondingly engage with the return structures 217, and can travel between a higher position and a lower position to trigger pushing of the electronic device 12 away from the connector 11.

The base 13 includes a receiving case 131 having a top opening 132, and a cover 133 for covering the top opening 132. The base 13 defines a connector through hole 134 and a number of engaging through holes 135 in the cover 133. In this embodiment, the base 13 defines two engaging through holes 135 correspondingly arranged at two opposite sides of the connector through hole 134. The cover 133 includes an upper surface 130, a lower surface 137, and a positioning sidewall 138. The lower surface 137 is parallel to the upper surface 130. The positioning sidewall 138 extends from the upper surface 130 and can be considered to partly encircle the combination of the connector through hole 134 and the engaging through holes 135. The positioning sidewall 138 defines a trackway 140 therein, to guide the electronic device 12 down to connect to the connector 11.

The connector 11 includes a main portion 110, a reduced portion 112 extended up from a top of the main portion 110, a peripheral step 114 defined between the reduced portion 112 and the main portion 110, and a terminal portion 116 extended up from a top of the reduced portion 112. The terminal portion 116 mechanically and electrically engages in an electrical socket of the electronic device 12 for providing the electrical power to the electronic device 12. The size of the reduced portion 112 is slightly less than that of the connector through hole 134. The size of the main portion is greater than that of the connector through hole 134.

Figure 3:
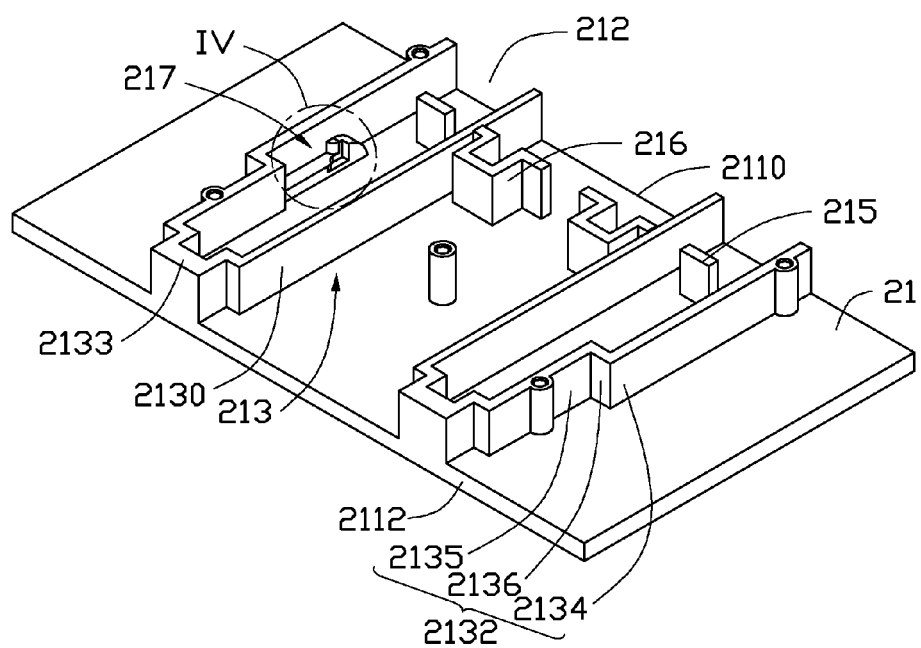
FIG. 3 is essentially an enlarged, isometric view of the restricting units of FIG. 2.

The pop-up mechanism 20 further includes a rear board 21, a pair of supporters 216, a pair of positioning plates 215, and a fastening board 218. Referring also to FIG. 3, the rear board 21 includes an upper edge 2110, and a lower edge 2112 parallel to the upper edge 2110. The restricting units 213 and the supporters 216 are formed on the rear board 21. The fastening board 218 is fastened on the restricting units 213, to cover the restricting units 213 and restrict the pushing pillars 231 received in the restricting units 213.

FIG. 3 shows that each of the restricting units 213 has a substantially elongated "U" shape. Each restricting unit 213 defines an upper opening 212 aligned with the upper edge 2110, and includes a sliding sidewall 2130, a restricting sidewall 2132, and a bottom sidewall 2133. The restricting sidewall 2132 includes an upper part 2134, a lower part 2135, and a step 2136. The upper part 2134 and the lower part 2135 are both parallel to the sliding sidewall 2130. A distance between the upper part 2134 and the sliding sidewall 2130 is greater than a distance between the lower part 2135 and the sliding sidewall 2130. The step 2136 connects the upper part 2134 with the lower part 2135. The bottom sidewall 2133 is aligned with the lower edge 2112, and connects the sliding sidewall 2130 with the lower part 2135. The pair of restricting units 213 extends from the rear board 21; and the restricting units 213 are parallel to each other along their longitudinal directions. The sliding sidewalls 2130 of the restricting units 213 face each other. In this embodiment, the pair of restricting units 213 is symmetrically arranged.

The positioning plates 215 extend from the rear board 21. Each positioning plate 215 is located between the upper part 2134 and the sliding sidewall 2130 of a respective restricting unit 213. The positioning plates 215 are oriented horizontally, and are close to the upper edge 2110 of the rear board 21. The positioning plates 215 are aligned with top plates of the supporters 216.

Each of the pushing pillars 231 includes a main body 2311, a pushing part 232, a positioning protrusion 2313, and an engaging arm 2315. The main body 2311 is substantially an elongated rectangular plate. The pushing part 232 is substantially a rectangular block and extends up from a top end of the main body 2311. The pushing part 232 includes a bottom end connecting the main body 2311. A positioning groove 2311a is defined in the bottom end. A holding plate 2311b perpendicularly extends from a bottom end of the main body 2311. The engaging arm 2315 is formed on top of the holding plate 2311b. An upper part of the engaging arm 2315 is slightly bent away from the main body 2311. The engaging arm 2315 includes an engaging protrusion 2314 extending out from a top end thereof in a direction away from the main body 2311. The engaging arm 2315 is made of a resilient material. Thus, the engaging arm 2315 can be deformed by application of an external force and rebound when the external force is removed. The positioning protrusion 2313 extends from an intermediate position of the main body 2311 between the pushing part 232 and the engaging arm 2315. The positioning protrusion 2313 is spaced away from the pushing part 232 a predetermined distance.

Figure 4:
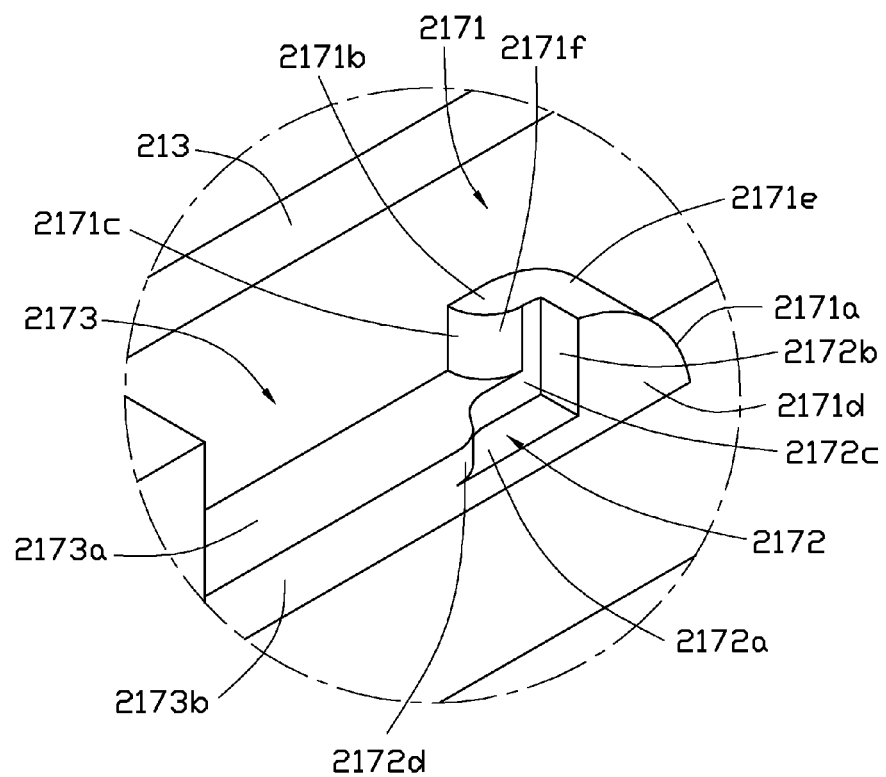
FIG. 4 is an enlarged view of a circled portion IV of FIG. 3.

FIGS. 3 and 4 show that each of the return structures 217 includes a connecting part 2173 and a guiding block 2171. The connecting part 2173 extends up from the corresponding step 2136 toward the upper opening 212. The connecting part 2173 includes a first side surface 2173b facing the corresponding sliding sidewall 2130, and a holding surface 2173a parallel to the rear board 21. In this embodiment, the connecting part 2173 is substantially in the form of an elongated rectangular rod.

The guiding block 2171 is formed on a top end of the connecting part 2173 away from the step 2136. The guiding block 2171 includes a top surface 2171a facing the corresponding upper opening 212, a front surface 2171b parallel to the rear board 21, a bottom surface 2171c facing the step 2136, a second side surface 2171d facing the sliding sidewall 2130, a first guiding surface 2171e, and a second guiding surface 2171f. A distance between the front surface 2171b and the rear board 21 is greater than a distance between the holding surface 2173a and the rear board 21. The first side surface 2173b and the second side surface 2171d are coplanar. The first guiding surface 2171e is convex, and smoothly connects the top surface 2171a with the front surface 2171b. The guiding block 2171 defines a positioning cutout 2172 at an intersection between the first side surface 2173b and the second side surface 2171d. The second guiding surface 2171f is convex, and extends from the bottom surface 2171c to the positioning cutout 2172.

The positioning cutout 2172 defines a back surface 2172a, an engaging surface 2172b, a transition surface 2172c, and a third guiding surface 2172d. The engaging surface 2172b, the transition surface 2172c, and the third guiding surface 2172d are perpendicular to the back surface 2172a. The engaging surface 2172b correspondingly connects the second side surface 2171d and the back surface 2172a. The transition surface 2172c interconnects the engaging surface 2172b and the third guiding surface 2172d. In particular, the transition surface 2172c smoothly connects the third guiding surface 2172d, and the third guiding surface 2172d is both concave and convex (i.e. wavy). The engaging surface 2172b connects the transition surface 2172c with the second side surface 2171d. The back surface 2172a is spaced away from the bottom of the return structure 217 a predetermined distance. In this embodiment, the first guiding surface 2171e and the second guiding surface 2171f are arced smooth surfaces, and the third guiding surface 2172d can be considered to be a double-arced smooth surface.

Figure 5:
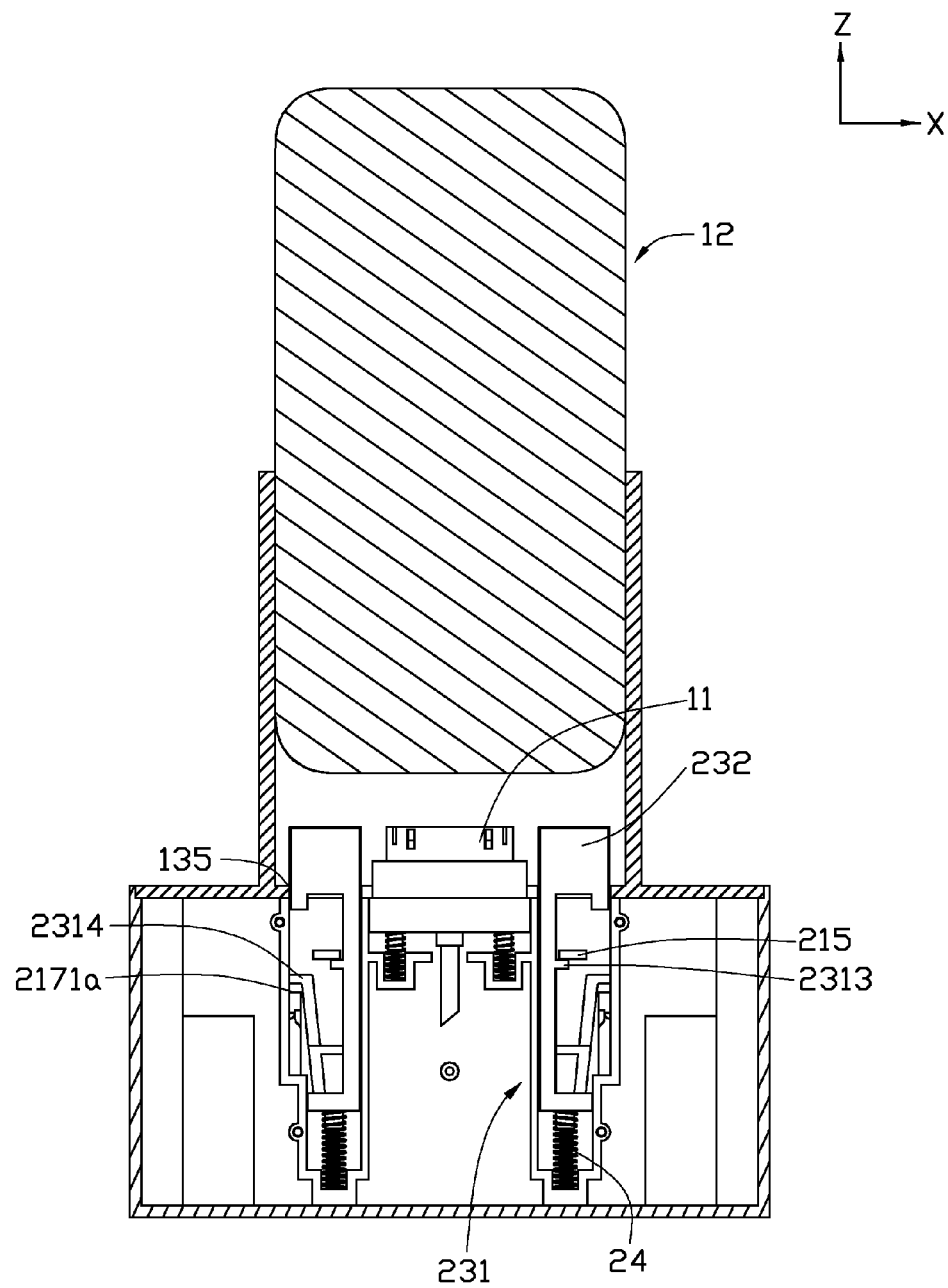
FIG. 5 is a cross-sectional view taken along line V-V of FIG. 1.

FIGS. 2 and 5 show that in assembly of the charger 10, the connector 11 is placed between the restricting units 213 and supported on the supporters 216 via a pair of first springs 111. The connector 11 is urged up by the first springs 111, and the peripheral step 114 is blocked by and abuts the lower surface 137. Therefore, only the reduced portion 112 and the terminal portion 116 are able to protrude up above the upper surface 130. The pushing pillars 231 are correspondingly and slidably received in the restricting units 213. The main body 2311 of each pushing pillar 231 slides along the corresponding sliding sidewall 2130. The bottom of the pushing pillar 231 resiliently connects with the corresponding bottom sidewall 2133 via a second spring 24. A bottom of the second spring 24 is held in a recess (not labeled) defined in a top of the bottom sidewall 2133. The pushing part 232 of the pushing pillar 231 is located above the corresponding positioning plate 215. The positioning plate 215 is located between the positioning protrusion 2313 and the bottom sidewall of the pushing part 232 at the positioning groove 2311a, to restrict a sliding range of the pushing pillar 231. The engaging protrusion 2314 is engaged with the corresponding return structure 217 to control a sliding position of the pushing pillar 231. In particular, when the engaging arm 2315 is in a relaxed position as shown in FIG. 5, the engaging protrusion 2314 closely abuts the rear board 21 and closely abuts the upper part 2134. The fastening board 218 is fastened to the rear board 21 via a number of fasteners 30, such as a number of bolts. The fastening board 218 covers the restricting units 213 and prevents the pushing pillars 231 from escaping out of the restricting units 213.

The pop-up mechanism 20 is thus firmly fixed in the receiving case 131. Top parts of the pushing pillars 23 protrude out of the restricting units 213 via the upper openings 212. The connector 11 protrudes out from the upper edge 2110 of the rear board 21. The cover 133 covers the receiving base 13. The connector 11 protrudes out of the base 13 via the connector through hole 134. The top parts of the pushing pillars 231 protrude out of the base 13 via the engaging through holes 135.

In operation, when the electronic device 12 is not connected to the connector 11, the pushing pillars 231 are pushed by the second springs 24 to uppermost positions at which the positioning protrusions 2313 are blocked by the positioning plates 215. In this state, the engaging protrusions 2314 are located above the top surfaces 2171a, as shown in FIG. 5. The pushing parts 232 protrude out of the base 13 via the engaging through holes 135.

Figure 6:
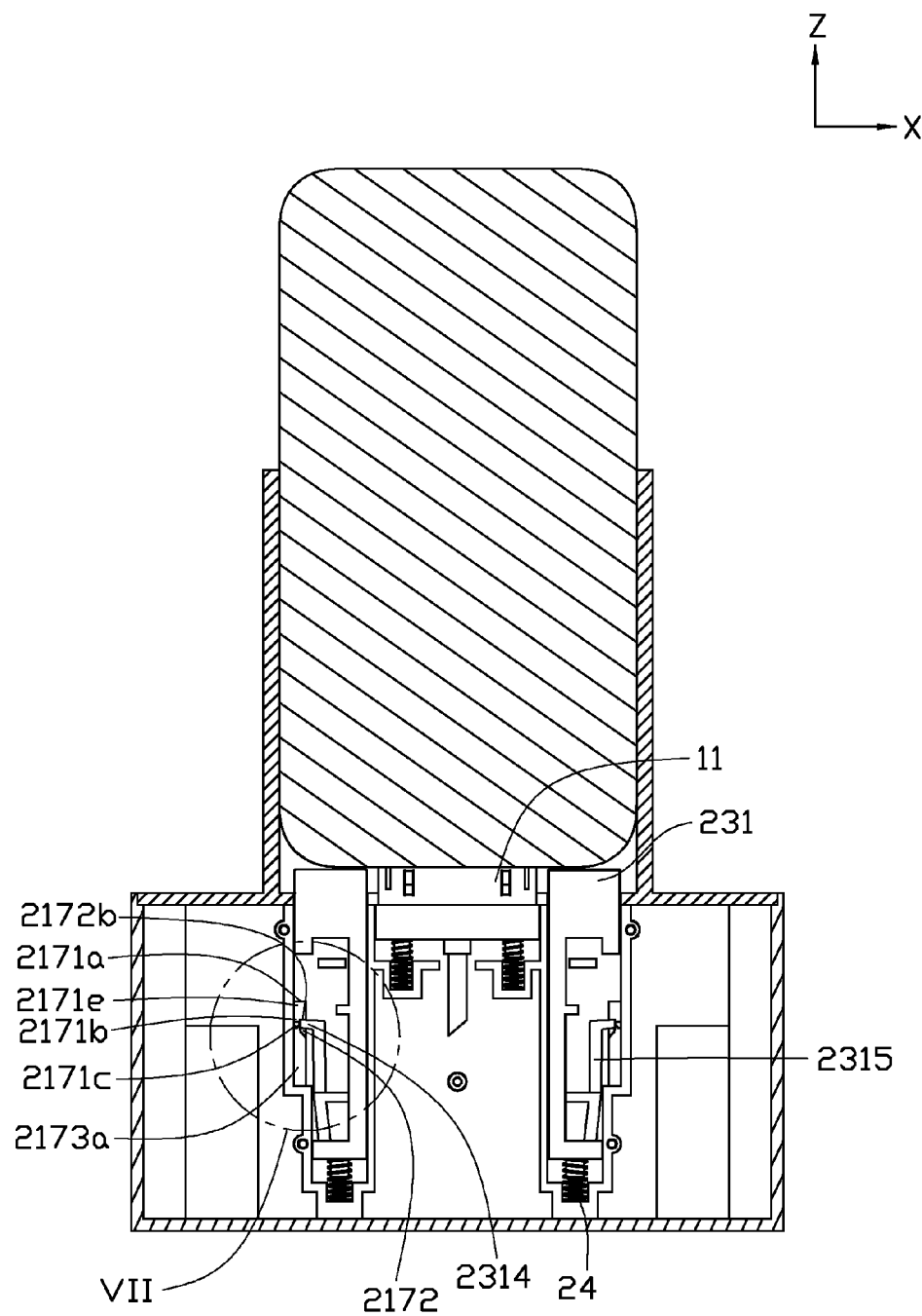
FIG. 6 is similar to FIG. 5, but showing the electronic device positioned further down and connected to an electrical connector of the charger.
Figure 7:
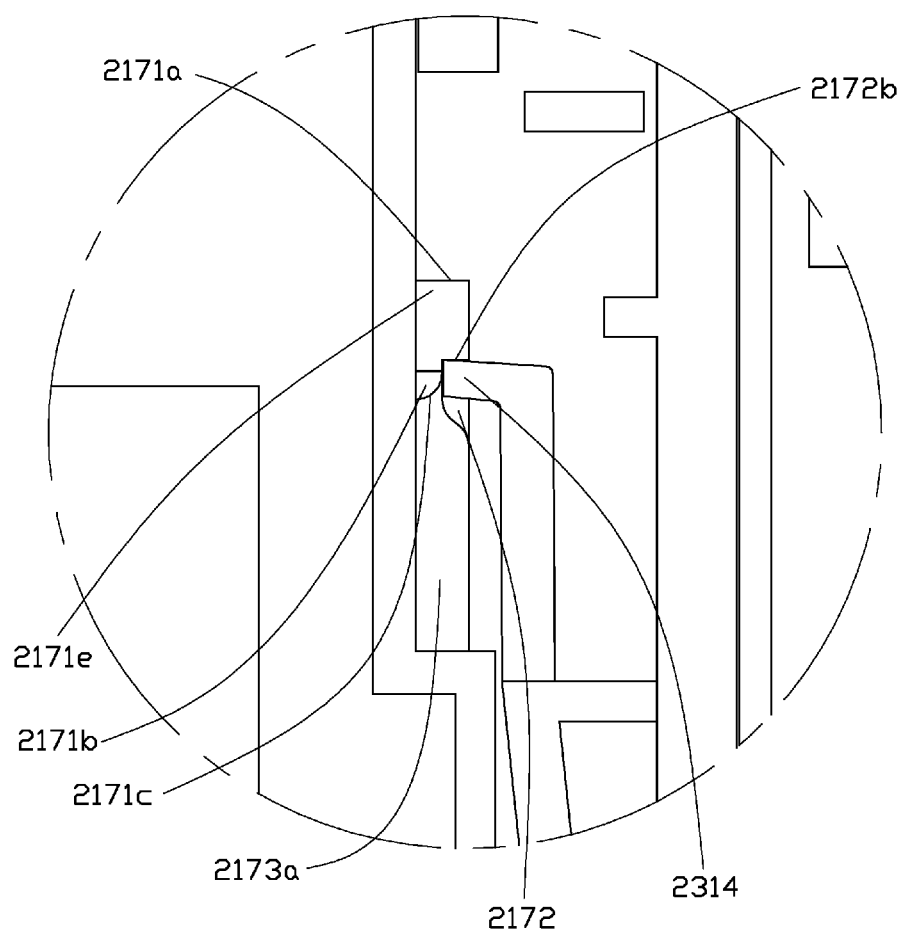
FIG. 7 is an enlarged view of a circled portion VII of FIG. 6.

FIGS. 6 and 7 show that when the electronic device 12 is pushed down by a user to connect with the connector 11, a bottom of the electronic device 12 pushes the pushing parts 232 and the connector 11 to move downwards until the bottom of the electronic device 12 approaches the upper edge 2110 of the rear board 21. The electronic device 12 is able to connect with the terminal portion 116 of the connector 11 because the first springs 111 are compressed and resist downward movement of the connector 11. During this process, the engaging arms 2315 are deformed such that the engaging protrusions 2314 bend away from the rear board 21. The engaging protrusions 2314 are forced to slide down along the top surfaces 2171a, the first guiding surfaces 2171e, the front surfaces 2171b, and the bottom surfaces 2171c, and then rebound partially and are held on the holding surfaces 2173a. Then when the user releases his/her pressure on the electronic device 12, the second springs 24 restore partially and drive the pushing parts 232 to move the electronic device 12 together with the connected connector 11 upwards a short distance. That is, the engaging protrusions 2314 slide upwards along the holding surfaces 2173a, the bottom surfaces 2171c, and the second guiding surfaces 2171f in that order. Finally, the engaging protrusions 2314 slide into the positioning cutouts 2172 and resist against the engaging surfaces 2172b, thereby preventing further upward movement of the pushing parts 232. At this time, the engaging arms 2315 are deformed such that the engaging protrusions 2314 are bent away from the upper parts 2134. The connector 11 is still connected to the electronic device 12 and majority portions of the pushing parts 232 remain retracted in the base 13. The tops of the pushing parts 232 contact the bottom of the electronic device 12 at opposite sides of the connected connector 11.

Figure 8:
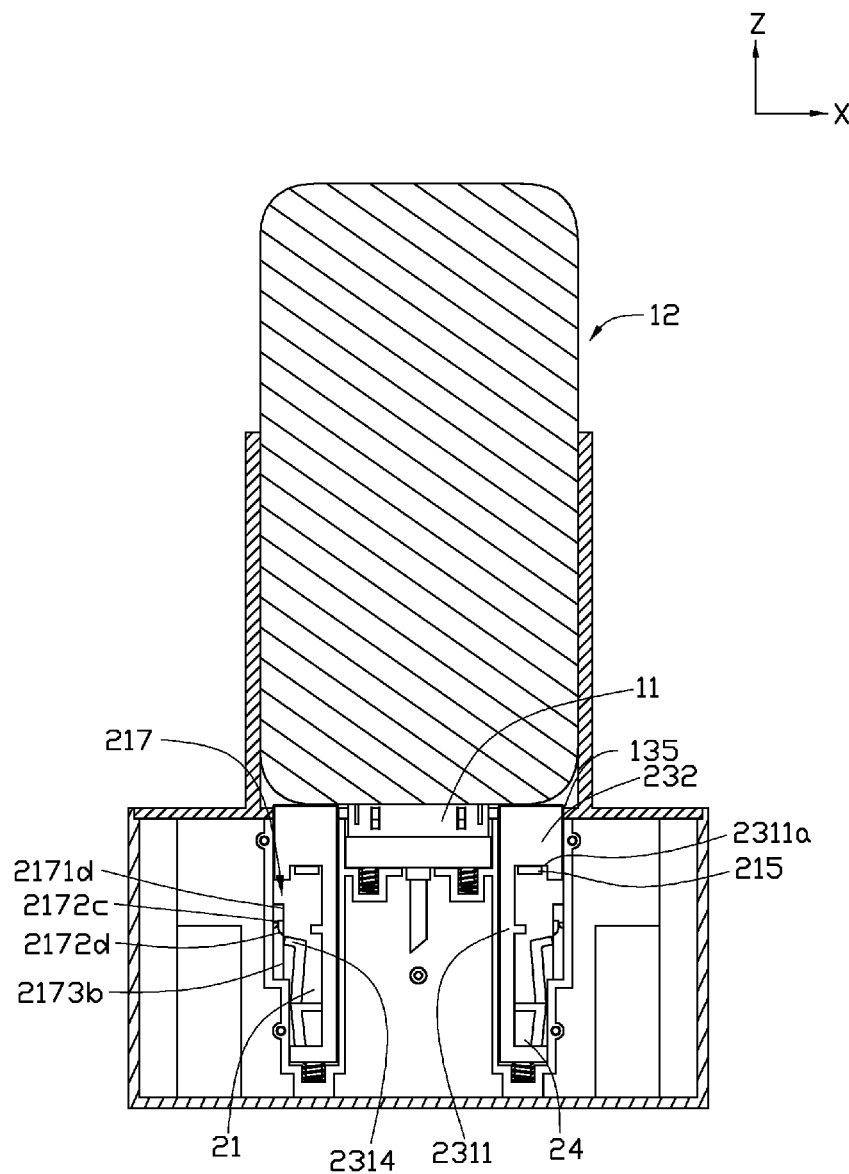
FIG. 8 is similar to FIG. 6, but showing the electronic device pressed further downwards in order to trigger release of the electronic device from connection with the electrical connector.

FIGS. 5 and 8 show that when the electronic device 12 is to be detached from the connector 11, the electronic device 12 is pushed downwards by the user. This drives the engaging protrusions 2314 out of the positioning cutouts 2172. In particular, the engaging protrusions 2314 slide along the transition surfaces 2172c and the third guiding surfaces 2172d and reach the first side surfaces 2173b. Once the engaging protrusions 2314 are on the first side surfaces 2173b, the engaging protrusions 2314 once again closely abut the rear board 21, and are freely slidable along the first side surfaces 2173b. The user releases his/her pressure on the electronic device 12, and the second springs 24 restore and push the electronic device 12 up. That is, the pushing parts 232 drive the bottom of the electronic device 12 together with the connected connector 11 to move upwards. During such movement, the peripheral step 114 becomes blocked by and abuts the lower surface 137, whereupon the electronic device 12 continues to move up and begins to detach from the connector 11. The pushing parts 232 continue to force the electronic device 12 up until the electronic device 12 is completely detached from the connector 11. During this process, the engaging protrusions 2314 slide upwards along the first side surfaces 2173b and the second side surfaces 2171d to reach positions above the guiding blocks 2171. Thus, the pushing parts 232 protrude out of the base 13 via the engaging through holes 135 for pushing the electronic device 12 away from the connector 11. Finally, the positioning protrusions 2313 become blocked by the positioning plates 215, and the pushing parts 232 are prevented from moving further upward. That is, the pushing parts 232 reach a predetermined distance above the upper surface 130. In this position, the electronic device 12 is completely detached from the connector 11.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A pop-up mechanism comprising:
   a board;
   a restricting unit formed on the board, and comprising a restricting sidewall and a bottom sidewall connecting the restricting sidewall;
   a pushing pillar slidably received in the restricting unit and resiliently connected to the bottom sidewall via a spring, the pushing pillar comprising a resilient engaging arm; and
   a return structure formed on the restricting sidewall and defining a positioning cutout therein;
   wherein the pushing pillar is urged by the spring and thereby held in an uppermost position in which a top of the resilient engaging arm is located above the return structure;
   when the pushing pillar is pressed downwards the resilient engaging arm elastically deforms and slides along the return structure and becomes engaged in the positioning cutout such that the pushing pillar is held in a lower position by the return structure with the spring being compressed; and
   when the pushing pillar is further pressed downwards the resilient engaging arm elastically deforms, slides along the return structure, and escapes from the positioning cutout with the spring being further compressed, whereupon the spring decompresses and drives the pushing pillar to move back up to the uppermost position at which the resilient engaging arm elastically returns to an original state.

2. The pop-up mechanism of claim 1, wherein the restricting unit further comprises a sliding sidewall parallel to the restricting sidewall, and the restricting unit defines an upper opening aligned with an upper edge of the board, the bottom sidewall connecting the restricting sidewall with the sliding sidewall.

3. The pop-up mechanism of claim 2, wherein the restricting sidewall comprises an upper part, a lower part, and a step, a distance between the upper part and the sliding sidewall is greater than a distance between the lower part and the sliding sidewall, and the step connects the upper part with the lower part.

4. The pop-up mechanism of claim 3, wherein the return structure comprises a connecting part extending up from the corresponding step toward the upper opening and a guiding block formed on a top end of the connecting part away from the step, and the connecting part comprises a first side surface facing the corresponding sliding sidewall and a holding surface parallel to the board.

5. The pop-up mechanism of claim 4, wherein the guiding block comprises a top surface facing the upper opening, a front surface parallel to the board, a bottom surface facing the step, a first guiding surface connecting the top surface with the front surface, and a second guiding surface extending from the bottom surface to the positioning cutout.

6. The pop-up mechanism of claim 5, wherein when the pushing pillar is pressed downwards to be held in the lower position, the engaging arm is forced to slide down along the top surface, the first guiding surface, the front surface, and the bottom surface, and then rebounds partially and is held on the holding surface, and finally slides into the positioning cutout by passing along the second guiding surface when the pressing on the pushing pillar is removed.

7. The pop-up mechanism of claim 5, wherein the guiding block further comprises a second side surface facing the sliding sidewall and being coplanar with the first side surface, the positioning cutout is defined at an intersection between the first side surface and the second side surface, the positioning cutout comprises a back surface below the holding surface, an engaging surface connecting the second side surface and the back surface, a third guiding surface facing the engaging surface, and a transition surface connecting the engaging surface with the third guiding surface, and the third guiding surface connects the transition surface with the second side surface.

8. The pop-up mechanism of claim 7, wherein the engaging arm resists against the engaging surface when the engaging arm is engaged in the positioning cutout; and when the pushing pillar is further pressed downwards, the engaging arm slides along the transition surface and the third guiding surface thereby escaping from the positioning cutout and reaching the first side surface.

9. The pop-up mechanism of claim 8, wherein the pushing pillar further comprises a main body, a pushing part extending up from a top end of the main body, and a positioning protrusion extending from an intermediate position of the main body below the top end, the resilient engaging arm extends up from a bottom end of the main body, the main body is slidable along the corresponding sliding sidewall, and the pop-up mechanism further comprises a positioning plate formed on the board and located between the sliding sidewall and the upper part; and when the pushing pillar is held in the uppermost position, the positioning protrusion is blocked by the positioning plate.

10. The pop-up mechanism of claim 9, wherein the pushing pillar defines a positioning groove in a bottom wall of the pushing part, and the positioning plate is located between the positioning protrusion and the bottom wall of the pushing part at the positioning groove such that a sliding range of the pushing pillar is restricted.

11. A charger for charging an electronic device, the charger comprising:
a base;
a connector protruding out of the base for connecting to the electronic device; and
a pop-up mechanism received in the base, and comprising:
a board;
a restricting unit formed on the board, and comprising a restricting sidewall and a bottom sidewall connecting the restricting sidewall;
a pushing pillar slidably received in the restricting unit and resiliently connected with the bottom sidewall via a spring, a top end of the pushing pillar protruding out of the base, the pushing pillar comprising a resilient engaging arm; and
a return structure formed on the restricting sidewall and defining a positioning cutout therein;
wherein the pushing pillar is urged by the spring and thereby held in an uppermost position in which a top of the resilient engaging arm is located above the return structure;
when the pushing pillar is pressed downwards by the electronic device, the electronic device becomes connected to the connector and the resilient engaging arm elastically deforms and slides along the return structure and becomes engaged in the positioning cutout such that the pushing pillar is held in a lower position by the return structure with the spring being compressed; and
when the pushing pillar is further pressed downwards by the electronic device, the resilient engaging arm elastically deforms, slides along the return structure, and escapes from the positioning cutout with the spring being further compressed, whereupon the spring decompresses and drives the pushing pillar to move back up toward the uppermost position, the electronic device disconnects from the connector, and the pushing pillar returns to the uppermost position at which the resilient engaging arm elastically returns to an original state.

12. The charger of claim 11, wherein the pop-up mechanism further comprises a plurality of restricting units formed on a board, each of the restricting units comprising a restricting sidewall and a bottom sidewall connecting the restricting sidewall, wherein the pushing pillars are slidably received in the restricting units and resiliently connected with the bottom sidewall via the spring, the return structures formed on the restricting sidewalls and defining a positioning cutout therein, the pushing pillar comprises a resilient engaging arm, the pushing pillar is stopped from sliding upwards when the resilient engaging arm is stuck in the positioning cutout, the pushing pillar is pushed to slide over the return structure by a restoring force of the spring when the resilient engaging arm is brought out of the positioning cutout.

13. The charger of claim 12, wherein each of the restricting units further comprises a sliding sidewall parallel to the restricting sidewall and defines an upper opening opposite to the bottom sidewall, the bottom sidewall connecting the restricting sidewall with the sliding sidewall.

14. The charger of claim 13, wherein the restricting sidewall comprises an upper part, a lower part, and a step, a distance between the upper part and the sliding sidewall is greater than a distance between the lower part and the sliding sidewall, the step connects the upper part with the lower part.

15. The charger of claim 14, wherein the return structure comprises a connecting part extending up from the corresponding step toward the upper opening and a guiding block formed on top end of the connecting part away from the step, the connecting part comprises a first side surface facing the corresponding sliding sidewall and a holding surface parallel to the board.

16. The charger of claim 15, wherein the guiding block comprises a top surface facing the upper opening, a front surface parallel to the board, a bottom surface facing the step, a first guiding surface connecting the top surface with the front surface, and a second guiding surface extending from the bottom surface to the positioning cutout.

17. The charger of claim 16, wherein the engaging arm are forced to slides down along the top surface, the first guiding surface, the front surface, and the bottom surface, and then rebound partially and are held on the holding surface, and finally slides into the positioning cutout by passing along the second guiding surface.

18. The charger of claim 16, wherein the guiding block further comprises a second side surface facing the sliding sidewall and being coplanar with the first side surface, the positioning cutout is defined at an intersection between the first side surface and the second side surface, the positioning cutout comprises a back surface below the holding surface, an engaging surface connecting the second side surface and the back surface, a third guiding surface facing the engaging surface, and a transition surface connecting the engaging surface with the third guiding surface, the third guiding surface also connects the transition surface with the second side surface.

19. The charger of claim 18, wherein the engaging arm resists against the engaging surface when the engaging arm is stuck in the positioning cutout, the engaging arm slides along the transition surface and the third guiding surface to escape from the positioning cutout when the pushing pillar is further pressed downwards.

20. The charger of claim 19, wherein the pushing pillar further comprises a main body, a pushing part extending up from a top end of the main body, and a positioning protrusion extending from an intermediate position of the main body, the resilient engaging arm extends from the other end of main body opposite to the pushing part, the main body slides along the sliding sidewall, the pop-up mechanism further comprises a positioning plate formed on the board and located between the sliding sidewall and the upper part, the pushing pillar is pushed by the spring to the uppermost position at which the positioning protrusion is blocked by the positioning plate when the engaging arm does not engage with the return structure.

* * * * *